United States Patent
Arashi et al.

(10) Patent No.: US 12,338,824 B2
(45) Date of Patent: Jun. 24, 2025

(54) ELECTRIC COMPRESSOR

(71) Applicant: MITSUBISHI HEAVY INDUSTRIES THERMAL SYSTEMS, LTD., Tokyo (JP)

(72) Inventors: Noriaki Arashi, Tokyo (JP); Koshi Taruma, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 0 days.

(21) Appl. No.: 18/579,887

(22) PCT Filed: Jul. 21, 2022

(86) PCT No.: PCT/JP2022/028404
§ 371 (c)(1),
(2) Date: Jan. 17, 2024

(87) PCT Pub. No.: WO2023/013433
PCT Pub. Date: Feb. 9, 2023

(65) Prior Publication Data
US 2024/0337261 A1 Oct. 10, 2024

(30) Foreign Application Priority Data

Aug. 6, 2021 (JP) .................................. 2021-129969

(51) Int. Cl.
*F04C 29/00* (2006.01)
*F04C 18/02* (2006.01)
(Continued)

(52) U.S. Cl.
CPC ...... *F04C 29/0085* (2013.01); *F04C 18/0215* (2013.01); *H02K 5/20* (2013.01); *H02K 11/33* (2016.01)

(58) Field of Classification Search
CPC .. F04C 29/0085; F04C 29/00; F04C 18/0215; F04C 23/008; F04C 2240/40;
(Continued)

(56) References Cited

U.S. PATENT DOCUMENTS 8,303,270 B2   11/2012   Iguchi et al.
11,398,762 B2 *  7/2022  Kobayashi ............. H02K 11/33
(Continued)

FOREIGN PATENT DOCUMENTS

EP   3 805 564 A1   4/2021
JP   2007-315402 A   12/2007
(Continued)

OTHER PUBLICATIONS

International Search Report for International Application No. PCT/JP2022/028404, dated Sep. 13, 2022, with English translation.
(Continued)

*Primary Examiner* — Dapinder Singh
(74) *Attorney, Agent, or Firm* — Birch, Stewart, Kolasch & Birch, LLP

(57) ABSTRACT

An object is to improve design flexibility. An electric compressor includes: a motor configured to drive a scroll compression mechanism that compresses a refrigerant; an inverter configured to drive the motor; a housing filled with the refrigerant and accommodating the motor; and a lower case connected to the housing, which is aligned with the lower case in the axial direction, and accommodating the inverter. The housing has a cylindrical first connection part centered on the center axis extending in the axis direction. The lower case has a cylindrical second connection part centered on the center axis extending in the axial direction. The outer circumferential surface of the first connection part and the inner circumferential surface of the second connection part are in contact with each other.

3 Claims, 5 Drawing Sheets

(51) Int. Cl.
*H02K 5/20* (2006.01)
*H02K 11/33* (2016.01)

(58) Field of Classification Search
CPC ......... F04C 2240/808; F04C 2240/803; H02K 5/20; H02K 5/04; H02K 5/161; H02K 5/225; H02K 5/22; H02K 11/33; F04B 35/04; F04B 39/121; F04B 39/12; F04B 39/00
See application file for complete search history.

(56) References Cited

U.S. PATENT DOCUMENTS

| | | | | |
|---|---|---|---|---|
| 11,486,378 | B2* | 11/2022 | Okochi | F04C 18/0215 |
| 11,629,713 | B1* | 4/2023 | Haseley | F04C 29/026 |
| | | | | 418/55.6 |
| 2016/0090987 | A1* | 3/2016 | Yamashita | F04B 39/121 |
| | | | | 417/410.5 |
| 2016/0353595 | A1 | 12/2016 | Yogo et al. | |
| 2019/0329654 | A1* | 10/2019 | Guntermann | B60L 1/003 |
| 2020/0040893 | A1 | 2/2020 | Her et al. | |
| 2020/0313495 | A1 | 10/2020 | Yamakage et al. | |
| 2021/0239106 | A1 | 8/2021 | Okochi et al. | |

FOREIGN PATENT DOCUMENTS

| | | |
|---|---|---|
| JP | 2015-183525 A | 10/2015 |
| JP | 2020-2880 A | 1/2020 |
| JP | 2020-165423 A | 10/2020 |
| KR | 10-2021-0090493 A | 7/2021 |

OTHER PUBLICATIONS

Written Opinion of the International Searching Authority for International Application No. PCT/JP2022/028404, dated Sep. 13, 2022, with English translation.
Extended European Search Report for European Application No. 22852857.6, dated Sep. 25, 2024.

* cited by examiner

ELECTRIC COMPRESSOR

TECHNICAL FIELD

The present disclosure relates to an electric compressor.

BACKGROUND ART

An inverter-integrated electric compressor in which an inverter device and an electric compressor are integrated is known. The inverter-integrated electric compressor is used as a compressor that compresses a refrigerant of an air conditioner installed in a vehicle such as an electric automobile or a hybrid vehicle. High-voltage DC power supplied from a power supply unit installed in a vehicle is converted into three-phase AC power with a required frequency by an inverter device, and this three-phase AC power is used to drive the electric compressor.

As an inverter-integrated electric compressor, there are electric compressors in which a housing that accommodates a motor, a compression mechanism, and the like and a housing that accommodates an inverter are aligned in the axial direction of the electric compressor and connected to each other (for example, Patent Literature 1).

Patent Literature 1 discloses an inverter-integrated electric compressor in which a circular cylindrical housing that accommodates a motor, a compression mechanism, and the like and an inverter case that accommodates an inverter are aligned in the axial direction (the direction in which a drive shaft provided in a compressor extends). In this device, a circular cylindrical protrusion protruding to the housing side is formed at the end of the inverter case, this protrusion is inserted into the housing, and thereby the inverter case and the housing are connected to each other. Further, in the outer circumferential surface of the protrusion of the inverter case, a groove is formed over the whole region in the circumferential direction, and leakage of a refrigerant in the housing from the connecting part between the inverter case and the housing is suppressed by an O-ring secured in this groove.

CITATION LIST

Patent Literature

[PTL 1]
Japanese Patent Application Laid-Open No. 2015-183525

SUMMARY OF INVENTION

Technical Problem

However, in the electric compressor of Patent Literature 1, the groove securing the O-ring is formed in the outer circumferential surface of the protrusion of the inverter case. Thus, during manufacturing, it is required to apply machining to form the groove to the outer circumferential surface of the protrusion of the inverter case. When forming the groove, it is required to cause a machining device (for example, a machining device to perform lathe machining) to come into contact with the outer circumferential surface from outside in the radial direction of the protrusion. At this time, if some structure is present outside in the radial direction of the protrusion, the machining device and the structure may interfere with each other. Thus, for example, when the inverter case is expanded outward in the radial direction from the protrusion of the inverter case in order to increase the internal volume of the inverter case, the expanded portion and the machining device may interfere with each other. Thus, it is not possible to expand the inverter case outward in the radial direction from the protrusion. It is therefore not possible to increase the internal volume of the inverter case. Further, it is required to increase the axial length of the inverter case when increasing the internal volume of the inverter case. Such an inverter case having an increased axial length causes a problem of an increased size of the electric compressor as a whole. This limits design flexibility.

The present disclosure has been made in view of such circumstances, and an object is to provide an electric compressor that can improve design flexibility.

Solution to Problem

To achieve the object described above, the electric compressor of the present disclosure employs the following solution.

An electric compressor according to one aspect of the present disclosure includes: a motor configured to drive a compression mechanism adapted to compress a refrigerant; an inverter configured to drive the motor; a motor housing part filled with the refrigerant and accommodating the motor; and an inverter housing part connected to the motor housing part and accommodating the inverter, the motor housing part being aligned with the inverter housing part in a predetermined direction, the motor housing part includes a cylindrical first connection part centered on a first center axis extending in the predetermined direction, the inverter housing part includes a cylindrical second connection part centered on a second center axis extending in the predetermined direction, and the outer circumferential surface of the first connection part and the inner circumferential surface of the second connection part are in contact with each other.

Advantageous Effects of Invention

According to the present disclosure, design flexibility can be improved.

DESCRIPTION OF EMBODIMENTS

One embodiment of an electric compressor according to the present disclosure will be described below with reference to the drawings.

An electric compressor 1 according to the present embodiment is an inverter-integrated electric compressor in which a scroll compression mechanism 7 driven by a motor 17 and an inverter 30 configured to drive the motor 17 are integrated. Further, the electric compressor 1 is used for compressing a refrigerant of an air conditioner installed in a vehicle such as an electric automobile or a hybrid vehicle, for example.

Figure 1:
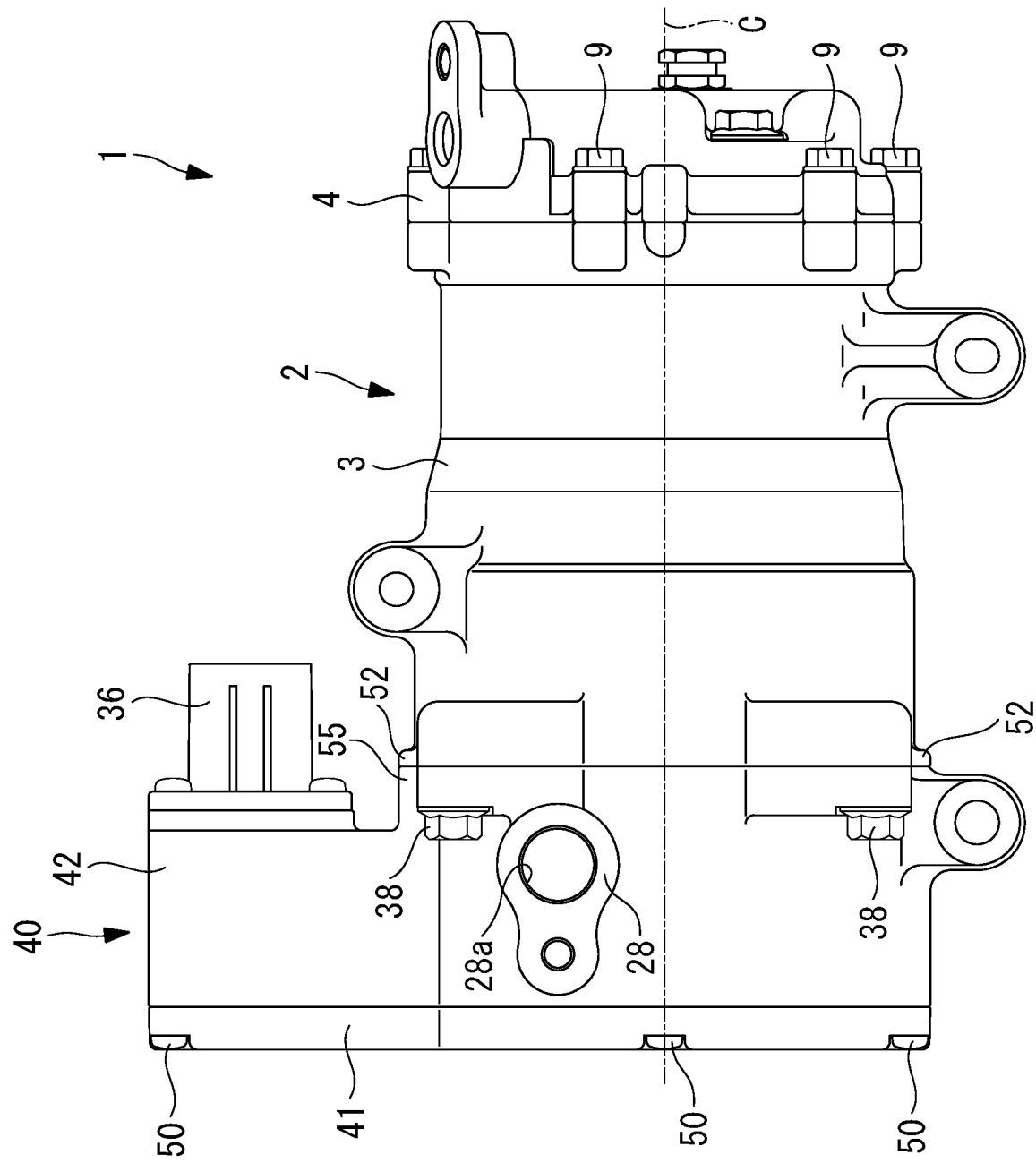
FIG. 1 is a side view of an electric compressor according to an embodiment of the present disclosure.
Figure 2:
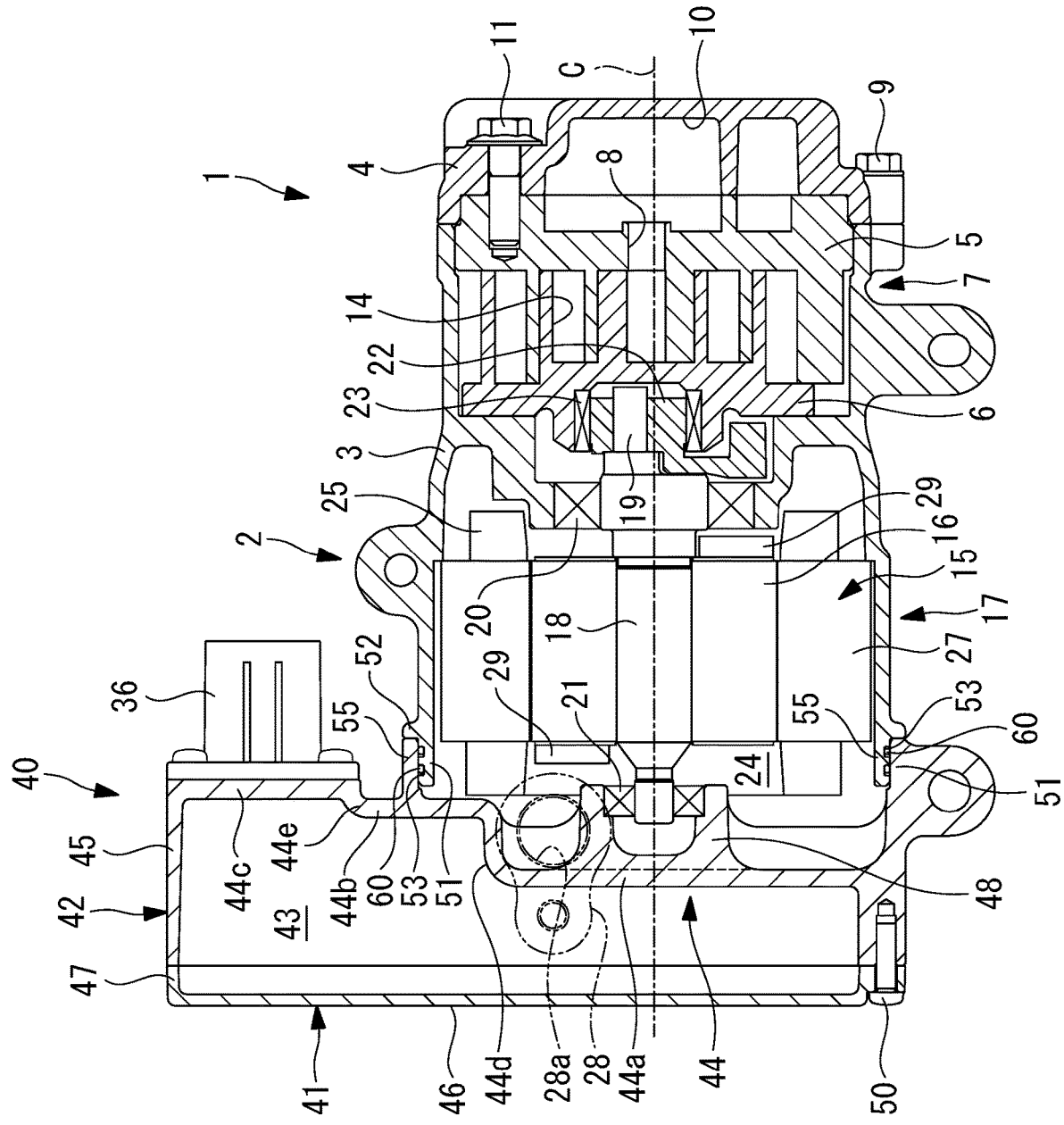
FIG. 2 is a longitudinal sectional view of the electric compressor according to the embodiment of the present disclosure.
Figure 3:
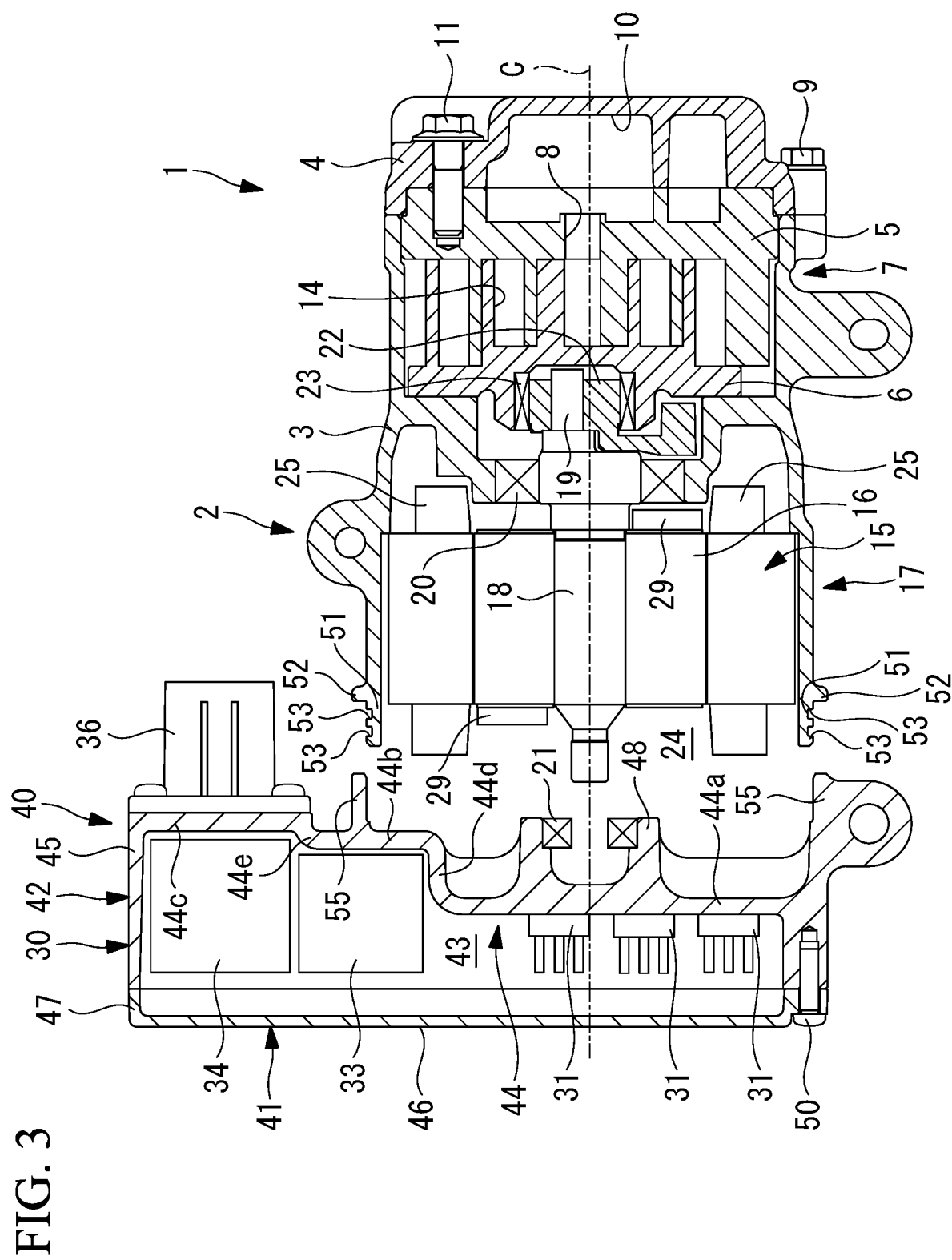
FIG. 3 is an exploded longitudinal sectional view of the electric compressor according to the embodiment of the present disclosure and illustrates a state where the housing and the lower case are not fixed to each other.

Note that, in the following description, a "center axis C" means the center axis when a drive shaft 18 connecting the motor 17 to the scroll compression mechanism 7 is rotated. Further, an "axial direction (or axial)" means the direction in which the center axis C extends. Further, the right side in the drawing sheet of FIG. 1 to FIG. 3 is referred to as "one side" or "one end side" in the axial direction, and the left side in the drawing sheet is referred to as "the other side" or "the other end side" in the axial direction. Further, a direction intersecting the center axis C is referred to as a "radial direction".

As illustrated in FIG. 1 and FIG. 2, the electric compressor 1 integrated with an inverter has a housing 2 that forms an outer shell.

The housing (a motor housing part) 2 has a circular cylindrical body 3 and a closure part 4 that closes one end side in the axial direction of the body 3. The other end side in the axial direction of the body 3 is closed by a lower case (an inverter housing part) 40 described later. Thus, the housing 2 and the lower case 40 form a closed space inside the housing 2. As illustrated in FIG. 2, the scroll compression mechanism 7, the motor 17, and the like described later are accommodated in the housing 2 (in detail, inside the body 3). Further, a gaseous refrigerant is filled inside the housing 2.

The body 3 is a circular cylindrical member extending in the center axis C. The center axis of the body 3 of the present embodiment matches the center axis C of the drive shaft 18. A circular opening is formed in both ends in the axial direction of the body 3. The opening on one end side of the body 3 is closed by the cover-like closure part 4. As illustrated in FIG. 1 and FIG. 2, the body 3 and the closure part 4 are coupled to each other by a plurality of bolts 9. The opening on the other end side of the body 3 is closed by the lower case 40. As illustrated in FIG. 1, the body 3 and the lower case 40 are coupled to each other by a plurality of bolts 38. The end on the other side of the body 3 is provided with a first connection part 51 that engages with the lower case 40. Details of the first connection part 51 will be described later.

As illustrated in FIG. 2, a known scroll compression mechanism (compression mechanism) 7 formed of a pair of a fixed scroll 5 and an orbiting scroll 6 is incorporated on one end side of the circular cylindrical body 3. A high-pressure refrigerant gas compressed by the scroll compression mechanism 7 is discharged into a discharge chamber 10 via a discharge outlet 8 and a discharge valve (not illustrated) provided in the exit of the discharge outlet 8. The refrigerant gas discharged into the discharge chamber 10 is discharged to outside of the housing 2 via a discharge port (not illustrated) provided in the closure part 4.

The fixed scroll 5 is fixed to the closure part 4 by a bolt 11. The orbiting scroll 6 is supported revolvably by a thrust bearing (not illustrated) via anti-autorotation means such as an Oldham rink system (not illustrated) or a pin ring system (not illustrated). Engagement of the fixed scroll 5 and the orbiting scroll 6 forms a compression chamber 14 between the fixed scroll 5 and the orbiting scroll 6. When the orbiting scroll 6 is driven to revolve, a refrigerant gas is moved from the outer circumferential side to the center side within the compression chamber 14 while the volume thereof is being reduced. Accordingly, the scroll compression mechanism 7 compresses the refrigerant gas.

The motor 17 formed of a stator 15 and a rotor 16 is embedded on the other end side of the circular cylindrical body 3. The drive shaft 18 is coupled to the rotor 16 in an integrated manner. The drive shaft 18 is rotatably supported by a first bearing 20 installed near the center inside the body 3 and a second bearing 21 provided in the lower case 40. The drive shaft 18 is rotated about the center axis C by the drive force of the motor 17. A crank pin 19 provided on one end side of the drive shaft 18 is connected to the orbiting scroll 6 via a balance bush 22 and an orbiting bearing 23. Accordingly, the drive shaft 18 transmits the drive force of the motor 17 to the orbiting scroll 6, that is, to the scroll compression mechanism 7.

The stator 15 has a stator core 27 formed of a stack of a required number of electromagnetic steel plates punched and molded into an annular shape. A plurality of teeth parts protruding inward in the radial direction are provided on the inner circumferential surface of the stator core 27. A coil is wound around the teeth parts via an insulating bobbin 25.

The rotor 16 is formed of a stack of a required number of magnetic steel plates punched and molded into an annular shape. Balance weights 29 are provided on both end faces of the rotor 16. The drive shaft 18 is coupled to the center of the rotor 16. Further, permanent magnets (not illustrated) are embedded in the outer circumference of the rotor 16, the number of permanent magnets corresponding to the number of motor poles.

Next, the inverter 30 and the lower case (inverter housing part) 40 will be described.

As illustrated in FIG. 3, the electric compressor 1 has the inverter 30 that drives the motor 17 and the lower case 40 that accommodates the inverter 30 therein. Note that depiction of the inverter 30 is omitted in FIG. 2 for illustrative purposes.

The inverter 30 converts DC power supplied from an external battery or the like into three-phase AC power with required frequency, applies the three-phase AC power to the motor 17 via hermetic terminals (not illustrated) penetrating through the lower case 40, and thereby drives the motor 17.

Further, for example, the inverter 30 has a power circuit board (not illustrated) mounted with a switching circuit formed of a plurality of power transistors such as IGBTs that are power semiconductor switching elements (hereafter, referred to as a "switching element(s) 31"), a control circuit board (not illustrated) mounted with a control communication circuit formed of elements such as a CPU operated at a low voltage that control the switching circuit based on externally input control signals, and electrical components such as a capacitor 33 and a coil 34 forming a noise cancelling filter circuit.

As illustrated in FIG. 2 and FIG. 3, the lower case 40 is connected to the housing 2 aligned with the lower case 40 in the axial direction (in a predetermined direction). The lower case 40 has an inverter housing space 43 formed inside. The inverter 30 described above is accommodated in the inverter housing space 43. The lower case 40 has a cover 41 defining the other end side in the axial direction of the inverter housing space 43 and a base 42 defining one end side in the axial direction and the end side in the radial direction of the inverter housing space 43. The cover 41 and the base 42 are fixed to each other by a plurality of bolts 50.

The cover 41 has, in an integrated manner, a flat plate-like flat plate part 46 defining the other end side in the axial direction of the inverter housing space 43 and a circular cylindrical flange 47 bent and extending at substantially a right angle from the outer end in the radial direction of the flat plate part 46.

The base 42 has, in an integrated manner, an installation part 44 defining one end side in the axial direction of the inverter housing space 43 and a frame 45 that is a substantially rectangular frame member defining the end part side in the radial direction of the inverter housing space 43. The frame 45 is bent and extends at substantially a right angle from the outer end in the radial direction of the installation part 44. The end on one side of the frame 45 is in contact with the end on the other side of the flange 47 of the cover 41.

The installation part 44 is a plate-like member. In the installation part 44, the switching elements 31, the capacitor 33, and the coil 34 are installed. The installation part 44 has a first installation part 44a in which the switching elements 31 are installed, a second installation part 44b in which the capacitor 33 is installed, and a third installation part (an outside part) 44c in which the coil 34 is installed.

The first installation part 44a is located on the other end side in the axial direction relative to the second installation part 44b. The first installation part 44a and the second installation part 44b are connected to each other via a first step part 44d. Further, the second installation part 44b is located on the other end side in the axial direction relative to the third installation part 44c. The second installation part 44b and the third installation part 44c are connected to each other via a second step part 44e.

As described above, the first installation part 44a and the second installation part 44b are connected to each other via a step part, and the second installation part 44b and the third installation part 44c are connected to each other via a step part. Accordingly, for the axial length of the inverter housing space 43, the section defined by the first installation part 44a is the shortest, the section defined by the second installation part 44b is the second shortest, and the section defined by the third installation part 44c is the longest.

The first installation part 44a is a plate-like member and is provided on the center axis C. As illustrated in FIG. 3, the plurality of switching elements 31 are fixed to the surface on the other side of the first installation part 44a (the surface facing the inverter housing space 43).

Further, the surface on one side of the first installation part 44a faces a space formed inside the housing 2 (in detail, the space 24). Further, the surface on one side of the first installation part 44a is provided in an integrated manner with a bearing fixing part 48 protruding to one end side. The bearing fixing part 48 has a circular cylindrical portion centered on the center axis C. The second bearing 21 is fixed to the inner circumferential surface of the circular cylindrical portion.

The second installation part 44b is a plate-like member and is provided on one end side relative to the first installation part 44a. As illustrated in FIG. 3, for example, electrical components such as the capacitor 33 are fixed to the surface on the other side of the second installation part 44b (the surface facing the inverter housing space 43). The surface on one side of the second installation part 44b is provided with a part of a second connection part 55 described later.

The third installation part 44c is a plate-like member and is provided on one end side relative to the first installation part 44a and the second installation part 44b. The third installation part 44c is provided outside in the radial direction relative to the second connection part 55 described later. Further, the second installation part 44b is provided on one end side in the axial direction relative to the end on the other side of the second connection part 55.

As illustrated in FIG. 3, for example, electrical components such as the coil 34 are fixed to the surface on the other side of the third installation part 44c (the surface facing the inverter housing space 43). An HV connector 36 is attached to substantially the entire region of a surface on one side of the third installation part 44c.

As illustrated in FIG. 1 and FIG. 2, the lower case 40 is provided with an suction port (an suction part) 28 used for taking in a low-pressure refrigerant gas from a refrigeration cycle. While the suction port 28 is provided in the lower case 40, an opening 28a formed at a downstream end of the suction port 28 is opened to the space inside the housing 2. Specifically, the opening 28a formed at the downstream end of the suction port 28 is opened to the space 24 between the lower case 40 and the end on the other side of the motor 17. Further, when the opening 28a is viewed in planar view, the opening 28a is arranged so as to be located between the bearing fixing part 48 and the first step part 44d. The suction port 28 guides the taken low-pressure refrigerant gas into the housing 2 (in detail, the space 24 between the lower case 40 and the end on the other side of the motor 17). The low-pressure refrigerant gas guided to the space 24 is guided to the scroll compression mechanism 7 via a refrigerant channel (not illustrated) formed in the motor 17 and is compressed in the scroll compression mechanism 7. Note that the example in which the opening 28a of the suction port 28 is arranged between the bearing fixing part 48 and the first step part 44d has been described in the present embodiment, but the arrangement of the opening 28a is not limited thereto. The bearing fixing part 48 is provided on the center axis C and is distant from the lower case 40. Thus, even when the opening 28a is arranged so as to overlap the bearing fixing part 48, the bearing fixing part 48 is less likely to block the suction refrigerant flow, and it is thus not required to provide the opening 28a so as to avoid the bearing fixing part 48. Therefore, for example, the opening 28a of the suction port 28 may be arranged so as to overlap the bearing fixing part 48 in planar view.

Next, the connecting part between the body 3 and the lower case 40 will be described in detail.

As illustrated in FIG. 2 and FIG. 3, the end on one side of the body 3 is provided with the first connection part 51. The first connection part 51 is a part of the body 3 and is circular cylindrical. Thus, the first connection part 51 has a circular cylindrical shape centered on the center axis (first center axis) C.

The body 3 has a protrusion 52 protruding outward in the radial direction from the outer circumferential surface. The first connection part 51 is provided on one end side in the axial direction relative to the protrusion 52. A plurality of grooves 53 (two grooves in the present embodiment) are formed in the outer circumferential surface of the first connection part 51. Each groove 53 is formed over the whole region in the circumferential direction of the first connection part 51. The plurality of grooves 53 are arranged at a predetermined interval in the axial direction. As illustrated in FIG. 2, an annular O-ring (an elastic member) 60 is arranged inside each groove 53 one by one. For example, the groove 53 is formed by a lathe machining device. Note that depiction of the O-ring is omitted in FIG. 3 for illustrative purposes.

The lower case 40 has the second connection part 55 protruding from the surface on the other side of the installation part 44. When viewed in the axial direction, the second connection part 55 is provided so as to overlap the first installation part 44a and the second installation part 44b. The second connection part 55 is provided in an integrated manner with the installation part 44.

The second connection part 55 has a circular cylindrical shape centered on the center axis (second center axis) C. The second connection part 55 has a larger diameter than the first connection part 51.

In a state where the lower case 40 and the housing 2 are connected to each other, the inner circumferential surface of the second connection part 55 is in contact with the outer circumferential surface of the first connection part 51. Further, the inner circumferential surface of the second connection part 55 is in contact with the O-rings 60 arranged in the grooves 53. Further, one end (tip) in the axial direction of the second connection part 55 is abutted against the protrusion 52. The other end (base end) in the axial direction of the second connection part 55 is connected to the installation part 44.

As described above, in the connecting part between the housing 2 (in detail, the body 3) and the lower case 40, the first connection part 51 is inserted into the second connection part 55. Further, the inner circumferential surface of the first connection part 51 and the outer circumferential surface of the second connection part 55 extending in the axial direction are in surface contact with each other, and thereby the connecting part between the housing 2 and the lower case 40 is sealed so that the refrigerant inside the housing 2 does not leak out. Furthermore, the O-rings 60 secured in the grooves 53 formed in the inner circumferential surface of the first connection part 51 are pressed and deformed by the first connection part 51 and the second connection part 55, and thereby the connection part is sealed.

According to the present embodiment, the following effects and advantages are achieved.

Figure 4:
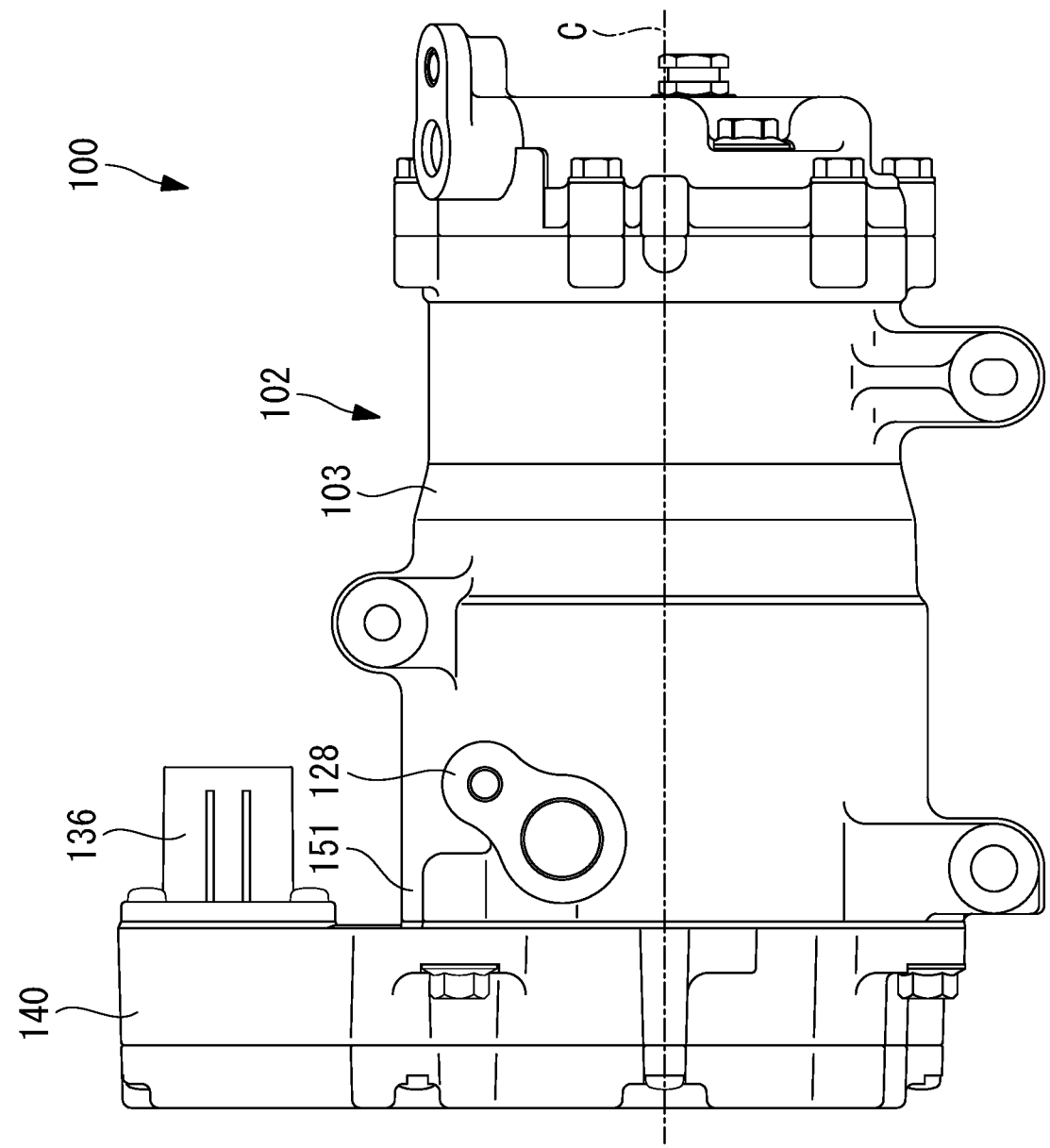
FIG. 4 is a side view of an electric compressor according to a comparative example.
Figure 5:
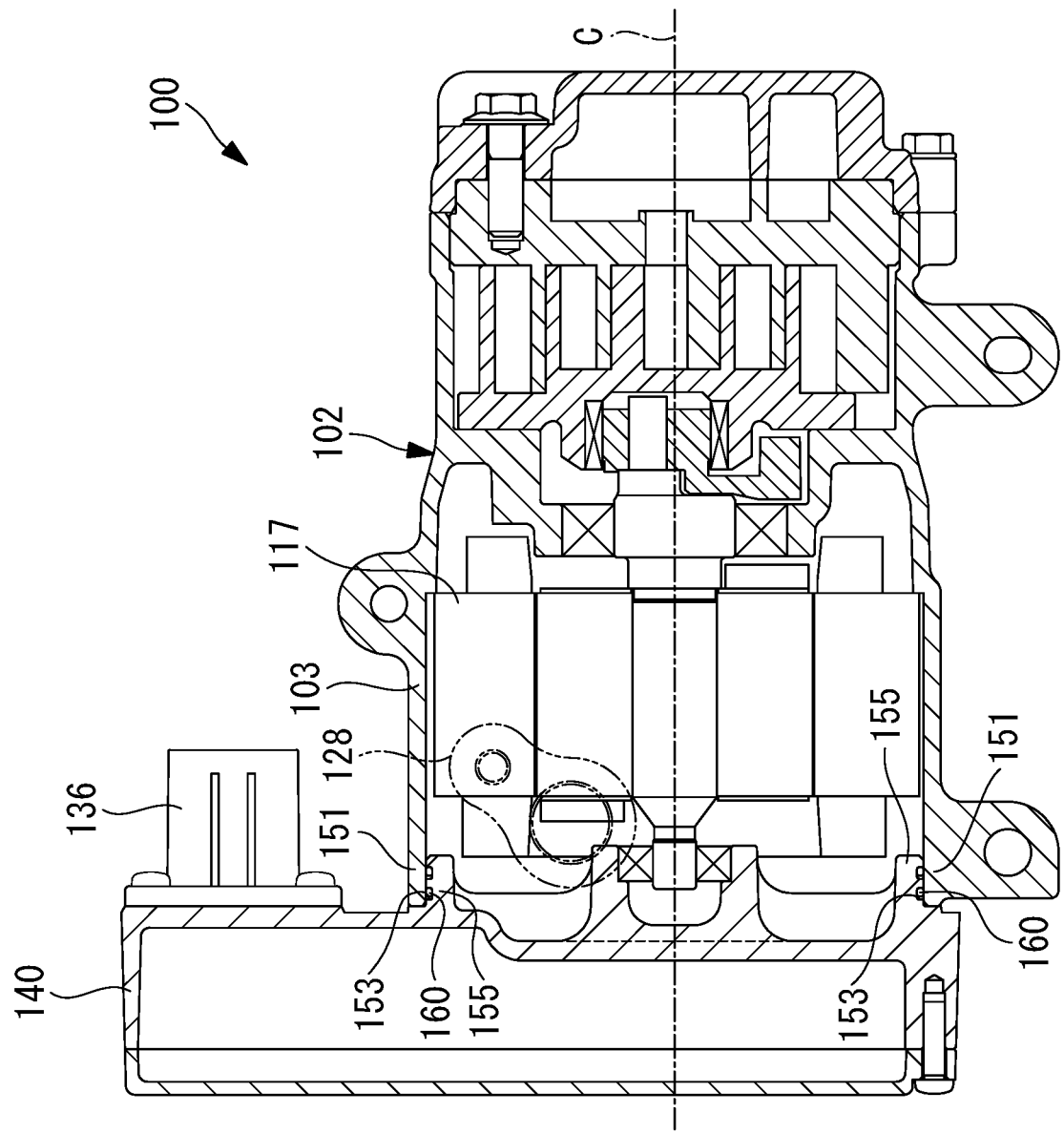
FIG. 5 is a longitudinal sectional view of the electric compressor according to the comparative example.

For example, as in an electric compressor 100 according to a comparative example illustrated in FIG. 4 and FIG. 5, when a first connection part 151 of the housing 102 is located outside in the radial direction relative to the second connection part 155 of the lower case 140, and grooves 153 for securing O-rings 160 are provided in the outer circumferential surface of the second connection part 155, it is required to perform machining for forming the grooves on the outer circumferential surface of the second connection part 155 of the lower case 140. In such a case, it is required to cause a machining device or the like (for example, a lathe machining device) to reach the outer circumferential surface from outside in the radial direction of the second connection part 155. At this time, no interference with the machining device will occur if the machining is applied in a state where components such as a detachable HV connector 136 are detached from the lower case 140. However, if an inseparable structure such as a part of the lower case 140 (for example, the third installation part 44c in the present embodiment) is present outside in the radial direction of the second connection part 155, the machining device and the structure may interfere with each other. Thus, in the electric compressor 100 according to the comparative example, it is difficult to provide a structure (in particular, a structure inseparable from the lower case 140) outside in the radial direction of the second connection part 155.

In contrast, in the present embodiment, the second connection part 55 of the lower case 40 seals, by the inner circumferential surface thereof, the connecting part between the body 3 and the lower case 40. This eliminates the need for applying machining for sealing to the outer circumferential surface of the second connection part 55. Therefore, even when a structure (for example, the third installation part 44c) is provided outside in the radial direction of the second connection part 55, the structure and the machining device do not interfere with each other. It is therefore possible to provide a structure outside in the radial direction of the second connection part 55. As set forth, it is possible to expand the lower case 40 outward in the radial direction of the second connection part 55. Thus, compared to the lower case 140 according to the comparative example, the axial length of the inverter housing space 43 defined by the third installation part 44c can be increased toward the one end side in the axial direction. It is therefore possible to increase the volume of the inverter housing space 43 formed inside the lower case 40 without increasing the axial length of the electric compressor 1. Further, it is possible to increase the volume of the inverter housing space 43 formed inside the lower case 40 without increasing the lower case 40 protruding length from the housing 2 to the one end side in the axial direction. Further, when the volume of the inverter housing space 43 of the lower case 40 is not increased, the axial length of the electric compressor 1 can be shortened for the amount by which the lower case 40 can be expanded outward in the radial direction of the second connection part 55.

As described above, since design flexibility can be improved, the internal volume of the lower case 40 can be increased without any manufacturing limitation in the radial direction and the axial direction. Further, it is possible to make a shape fitted to the layout of an intended apparatus for installation of the electric compressor 1 (in the present embodiment, a vehicle as an example), and this enables easier installation in the intended apparatus.

Further, in the present embodiment, the grooves 53 are formed in the outer circumferential surface of the first connection part 51, and the O-rings 60 in contact with the inner circumferential surface of the second connection part 55 are secured in the grooves 53. Accordingly, the O-rings 60 come into contact with the inner circumferential surface of the second connection part 55 and are thereby elastically deformed. It is therefore possible to further suppress leakage of a refrigerant from the connecting part between the body 3 and the lower case 40.

Further, since the grooves 53 are formed in the first connection part 51 of the body 3, it is not required to form the grooves 53 in the lower case 40. Accordingly, it is ensured that the structure does not require machining for sealing to be applied to the outer circumferential surface of the second connection part 55 of the lower case 40.

Further, in the present embodiment, the second connection part 55 of the lower case 40 is located outside in the radial direction relative to the first connection part 51 of the housing 2. Thus, the second connection part 55 is abutted against the first connection part 51 from outside in the radial direction. Thus, the outer circumferential surface of the second connection part 55 is exposed. Accordingly, the area of the outer circumferential surface of the lower case 40 is increased for the amount by which the second connection part 55 is externally exposed. It is therefore possible to provide the suction port 28 in the outer circumferential surface of the lower case 40.

In the case of the lower case 140 according to the comparative example, as illustrated in FIG. 4, the insufficient area of the outer circumferential surface of the lower case 140 makes it difficult to provide the suction port 128 in the outer circumferential surface of the lower case 140. Thus, in the electric compressor 100 according to the comparative example, the suction port 128 is provided in the outer circumferential surface of the housing 102. Because the suction port 128 is provided in the housing 102, as illustrated in FIG. 5, the position of the suction port 128 is the position overlapping the motor 117. Thus, a refrigerant taken in from the suction port 128 is likely to collide with the motor 117.

In contrast, as in the present embodiment illustrated in FIG. 2, the suction port 28 is provided in the lower case 40, and thereby the suction port 28 can be provided on the other end side in the axial direction of the electric compressor 1 compared to a case where the suction port 28 is provided in the housing 2. This makes it possible to provide the suction port 28 at a position not overlapping the motor 17. Therefore, a refrigerant taken in from the suction port 28 is less likely to collide with the motor 17. This can reduce a pressure loss of the refrigerant taken in from the suction port 28.

Further, since the suction port 28 is provided in the lower case 40, a low-temperature refrigerant taken in from the suction port 28 flows through near the inverter 30 compared to a case where the suction port 28 is provided in the body 3. Therefore, the inverter 30 can be cooled more appropriately by the refrigerant.

Further, in the electric compressor 100 according to the comparative example, as illustrated in FIG. 5, the first connection part 151 is located outside in the radial direction relative to the second connection part 155. Thus, the end of the first connection part 151 located outside is located near a corner close to the lower case 140, a foreign material such as moisture (condensed water) is likely to be retained in the corner, and the first connection part 151 and the member in contact with the first connection part 151 are likely to corrode.

In contrast, in the present embodiment, as illustrated in FIG. 2, the second connection part 55 is located outside in the radial direction relative to the first connection part 51. Thus, the end of the second connection part 55 located outside is located distant from the lower case 40 and is also distant from the corner, a foreign material such as moisture (condensed water) is less likely to be retained, and corrosion of the second connection part 55 and a member in contact with the second connection part 55 can be suppressed.

Further, in the electric compressor 100 according to the comparative example, as illustrated in FIG. 5, the first connection part 151 is located outside in the radial direction relative to the second connection part 155. The first connection part 151 is the end of the circular cylindrical body 103 elongated in the axial direction and thus is easily deformed.

In contrast, in the present embodiment, as illustrated in FIG. 2, the second connection part 55 is located outside in the radial direction relative to the first connection part 51. The second connection part 55 has a relatively short axial length and thus has high rigidity. Thus, a situation where the second connection part 55 is deformed away from the first connection part 51 is less likely to occur. Therefore, a gap is less likely to be formed between the second connection part 55 and the first connection part 51, and leakage of the refrigerant can be further suppressed.

Note that the present disclosure is not limited to each embodiment described above, and modification can be made as appropriate within the scope not departing from the spirit of the present disclosure.

For example, the example in which the switching elements 31 are installed in the first installation part 44a, the capacitor 33 is installed in the second installation part 44b, and the coil 34 is installed in the third installation part 44c has been described in the above embodiment, but the arrangement of components forming the inverter installed inside the lower case 40 is not limited thereto. The arrangement of the components forming the inverter installed inside the lower case 40 may be changed as appropriate in accordance with various conditions.

Further, the example in which two grooves 53 are formed in the first connection part 51 has been described in the above embodiment, but the present disclosure is not limited thereto. The number of grooves 53 may be one or may be three or greater.

Further, the example in which the center axis of the first connection part 51 and the center axis of the second connection part 55 are the same has been described in the above embodiment, but the present disclosure is not limited thereto. The center axis of the first connection part 51 and the center axis of the second connection part 55 may not be the same.

The electric compressor according to the embodiment described above is understood as follows, for example.

An electric compressor according to one aspect of the present disclosure includes: a motor (17) configured to drive a compression mechanism (7) adapted to compress a refrigerant; an inverter (30) configured to drive the motor; a motor housing part (2) filled with the refrigerant and accommodating the motor; and an inverter housing part (40) connected to the motor housing part and accommodating the inverter, the motor housing part being aligned with the inverter housing part in a predetermined direction, the motor housing part includes a cylindrical first connection part (51) centered on a first center axis (C) extending in the predetermined direction, the inverter housing part includes a cylindrical second connection part (55) centered on a second center axis (C) extending in the predetermined direction, and the outer circumferential surface of the first connection part and the inner circumferential surface of the second connection part are in contact with each other.

In the above configuration, the outer circumferential surface of the first connection part of the motor housing part and the inner circumferential surface of the second connection part of the inverter housing part are in contact with each other. This can suppress leakage of the refrigerant from the connecting part between the motor housing part and the inverter housing part. It is possible to seal the connecting part between the motor housing part and the inverter housing part.

For example, when applying some machining to the outer circumferential surface of the second connection part of the inverter housing part, it is required to cause a machining device or the like to reach the outer circumferential surface from outside in the radial direction of the second connection part (the direction intersecting the second center axis). At this time, if some structure is present outside in the radial direction of the second connection part, the machining device and the structure may interfere with each other. Thus, when applying some machining to the outer circumferential surface of the second connection part of the inverter housing part, it is difficult to provide a structure outside in the radial direction of the second connection part.

In contrast, in the above configuration, the second connection part of the inverter housing part seals, by the inner circumferential surface thereof, the connecting part between the motor housing part and the inverter housing part. This eliminates the need for applying machining for sealing to the outer circumferential surface of the second connection part. Therefore, even when a structure is provided outside in the radial direction of the second connection part, the structure and the machining device do not interfere with each other. It is thus possible to provide a structure outside in the radial direction of the second connection part. As set forth, it is possible to expand the inverter housing part outward in the radial direction of the second connection part. It is thus possible to increase the internal volume of the inverter housing part without increasing the length in a predetermined direction of the electric compressor. Further, it is possible to increase the internal volume of the inverter housing part without increasing the inverter housing part protruding length from the motor housing part in the predetermined direction. Further, when the internal volume of the inverter housing part is not increased, the length in the predetermined direction of the electric compressor can be shortened for the amount by which the inverter housing part can be expanded outward in the radial direction of the second connection part.

As described above, since design flexibility can be improved, the internal volume of the inverter housing part can be increased without any manufacturing limitation in the radial direction and the predetermined direction. Further, it is possible to make a shape fitted to the layout of an intended apparatus for installation of the electric compressor, and this enables easier installation in the intended apparatus.

Further, in the electric compressor according to one aspect of the present disclosure, a groove (53) in which an elastic member (60) in contact with the inner circumferential surface of the second connection part is secured is formed in the outer circumferential surface of the first connection part.

In the above configuration, the groove is formed in the outer circumferential surface of the first connection part, and the elastic member in contact with the inner circumferential surface of the second connection part is secured in the groove. Accordingly, the elastic member comes into contact with the inner circumferential surface of the second connection part and thereby is elastically deformed. It is therefore possible to suppress leakage of the refrigerant from the connecting part between the motor housing part and the inverter housing part.

Further, since the groove is formed in the first connection part of the motor housing part, it is not required to form a groove in the inverter housing part. Accordingly, it is ensured that the structure does not require machining for sealing to be applied to the outer circumferential surface of the second connection part of the inverter housing part.

Further, in the electric compressor according to one aspect of the present disclosure, an suction part (28) configured to guide the refrigerant into the motor housing part is provided in an outer circumferential surface of the inverter housing part.

In the above configuration, the suction part is provided in the inverter housing part. Accordingly, a low-temperature refrigerant taken in from the suction part flows through near the inverter compared to a case where the suction part is provided in the motor housing part. Therefore, the inverter can be cooled more preferably by the refrigerant.

Further, in the electric compressor according to one aspect of the present disclosure, the inverter housing part includes an outside part (44c) located outside in a radial direction relative to the second connection part, and the outside part is located on a motor housing part side relative to one of ends of the second connection part which is opposite to the motor housing part side.

In the above configuration, the inverter housing part is provided with the outside part located outside in the radial direction of the second connection part. Accordingly, it is possible to expand the inverter housing part outward in the radial direction for the amount by which the outside part is provided. It is thus possible to increase the internal volume of the inverter housing part without increasing the length in a predetermined direction of the electric compressor. Further, when the internal volume of the inverter housing part is not increased, the length in the predetermined direction of the electric compressor can be shortened for the amount by which the inverter housing part can be expanded outward in the radial direction of the second connection part.

REFERENCE SIGNS LIST 1 electric compressor
2 housing
3 body
4 closure part
5 fixed scroll
6 orbiting scroll
7 scroll compression mechanism
8 discharge outlet
9 bolt
10 discharge chamber
11 bolt
14 compression chamber
15 stator
16 rotor
17 motor
18 drive shaft
19 crank pin
20 first bearing
21 second bearing
22 balance bush
23 orbiting bearing
24 space
25 insulating bobbin
27 stator core
28 suction port
28a opening
29 balance weight
30 inverter
31 switching element
33 capacitor
34 coil
36 HV connector
38 bolt
40 lower case
41 cover
42 base
43 inverter housing space
44 installation part
44a first installation part
44b second installation part
44c third installation part
44d first step part
44e second step part
45 frame
46 flat plate part
47 flange
48 bearing fixing part
50 bolt
51 first connection part
52 protrusion
53 groove
55 second connection part
60 O-ring

The invention claimed is:

1. An electric compressor comprising:
a motor configured to drive a compression mechanism adapted to compress a refrigerant;

an inverter configured to drive the motor;
a motor housing part filled with the refrigerant and accommodating the motor; and
an inverter housing part connected to the motor housing part and having an inverter housing space accommodating the inverter, the motor housing part being aligned with the inverter housing part in a predetermined direction,
wherein a motor housing space accommodating the motor is formed by the motor housing part and the inverter housing part,
wherein the motor housing part includes a cylindrical first connection part centered on a first center axis extending in the predetermined direction,
wherein the inverter housing part includes a cylindrical second connection part centered on a second center axis extending in the predetermined direction and an installation part defining one end side in the predetermined direction of the inverter housing space,
wherein an outer circumferential surface of the first connection part and an inner circumferential surface of the second connection part are in contact with each other,
wherein a surface on one side of the installation part faces the motor housing space and a surface on the other side of the installation part faces the inverter housing space, and
wherein a suction part configured to guide the refrigerant into the motor housing space is provided in an outer circumferential surface of the inverter housing part.

2. The electric compressor according to claim 1, wherein a groove in which an elastic member in contact with the inner circumferential surface of the second connection part is secured is formed in the outer circumferential surface of the first connection part.

3. The electric compressor according to claim 1,
wherein the inverter housing part includes an outside part located outside in a radial direction relative to the second connection part, and
wherein the outside part is located on a motor housing part side relative to one of ends of the second connection part which is opposite to the motor housing part side.

* * * * *